United States Patent [19]

Jouaneh et al.

[11] Patent Number: 5,367,140
[45] Date of Patent: Nov. 22, 1994

[54] METHOD FOR LASER WELDING OF OPTICAL PACKAGES

[75] Inventors: Musa K. Jouaneh, Narragansett, R.I.; Sabbir S. Rangwala, Allentown, Pa.

[73] Assignee: AT&T Bell Laboratories, Murray Hill, N.J.

[21] Appl. No.: 173,849

[22] Filed: Dec. 27, 1993

[51] Int. Cl.⁵ ............................................. B23K 26/00
[52] U.S. Cl. .................................. 219/121.64; 385/96
[58] Field of Search ...................... 219/121.63, 121.64, 219/121.83; 385/96

[56] References Cited

U.S. PATENT DOCUMENTS

| | | | |
|---|---|---|---|
| 5,058,124 | 10/1991 | Cameron et al. | 372/107 |
| 5,218,258 | 6/1993 | Shirasu et al. | 310/323 |
| 5,300,755 | 4/1994 | Nishstani et al. | 219/121.63 |

Primary Examiner—C. L. Albritton
Attorney, Agent, or Firm—Richard D. Laumann

[57] ABSTRACT

A piezoelectric actuator is used to control the relative positions of a laser and optical fiber during laser welding of components to a base.

6 Claims, 2 Drawing Sheets

METHOD FOR LASER WELDING OF OPTICAL PACKAGES

TECHNICAL FIELD

This invention relates generally to methods for attaching lasers to optical packages and particularly to such methods that use laser welding.

BACKGROUND OF THE INVENTION

There are many technological applications that require that two or more components be rigidly positioned with respect to each other. A single example will suffice to illustrate this point. Many, if not most, optical communications systems inject light from a semiconductor laser into an optical fiber. The light emitted from the laser is concentrated in a very narrow angular region or cone. Optical communications systems typically transmit information more accurately with higher optical power, and the efficiency with which light from the laser is injected into the fiber is a critical system parameter. High injection efficiency between the laser and the fiber depends upon the laser and the optical fiber being accurately aligned with respect to each other. For example, in a typical present day laser package, a 1 μm misalignment of the laser with respect to the fiber can result in a 3 dB loss of light coupled into the fiber. The alignment must not only be initially accurate but must also be rigid and not susceptible to change while the laser is used under varying conditions.

As might be anticipated, many methods that align optical fibers and lasers with respect to each other have been investigated for use in making optical packages. The simplest techniques use epoxy or solder to maintain the relative position of the fiber and laser. These techniques, however, do not provide great rigidity as the package is used and subjected to varying ambient conditions. Relative alignment of the laser and fiber can vary during use. A technique that can provide greater precision and durability is laser welding. Advantages of this technique include: 1) joint strength that approaches that of the parent materials; 2) minimal contamination because the process is fluxless and does not require a filler material; and 3) localized heating that confines distortion effects to a relatively small area around the weld zone. Laser welding is well known. See, for example, U.S. Pat. No. 5,218,258, issued on Jun. 8, 1993 to Shirasu et al.

However, the successful implementation of laser welding is not without problems. The localized heating produced in laser welding creates thermoelastic deformations and stresses in the welded components. The thermal distortions that result cause small relative movements between the laser and the optical fiber which can significantly degrade the amount of light coupled into the optical fiber. Even clamping of the components does not completely eliminate the small or micro movements of the components.

Real time monitoring and correction of the relative positions during the welding process would be desirable. Such monitoring and correction has been provided in diamond turning to correct geometrical errors, that is, adjust position, and in lithography to provide high resolution positioning by many types of actuators including piezoelectric, dc or stepping motors, linear drives. These actuators provide high resolution positioning in small time intervals. Since weld time intervals are small, fast response time positioners are required. However, use of piezoelectric actuators for relative position control during a joining process has not been extended to optical packages.

The use of piezoelectrics in optical packages is known. See, for example, U.S. Pat. No. 5,058,124 issued on Oct. 15, 1991 to Camerson et al. (Camerson). Camerson describes the use of a piezoelectric stack to position an external cavity with respect to a laser chip.

SUMMARY OF THE INVENTION

According to an exemplary embodiment of this invention, laser welding of components in an optical package is performed using a piezo-electric actuator to maintain the relative positions of two components during the laser welding process, including the cooling process that follows termination of the application of the laser energy to the package. The package has a light source, such as a laser, and an optical fiber in a fiber tube, which is maintained in position by a saddle attached to a base. The piezoelectric actuator moves the fiber in a direction perpendicular to the longitudinal axis of the fiber to position the fiber with respect to the laser while the light transmitted through the laser is monitored. The laser pin welds the fiber tube to the saddle where the laser strikes the interface between the fiber tube and saddle.

For reasons of clarity, the elements depicted are not drawn to scale.

DETAILED DESCRIPTION

Figure 1:
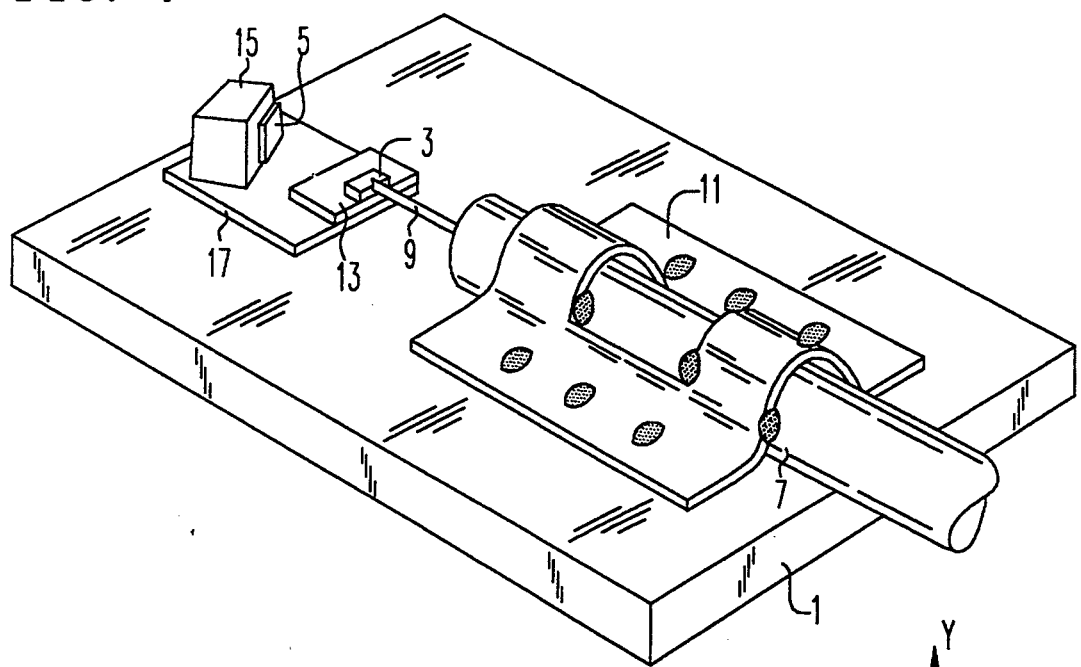
FIG. 1 is a depiction of a portion of a laser welded package.

The invention will be described by reference to a particular embodiment. Depicted in FIG. 1 is an optical package having a base 1, laser and back face monitor chips 3 and 5, respectively; a fiber tube 7 having a soldered single mode fiber 9 and a saddle 11. The chips 3 and 5 are soldered to mounts 13 and 15, respectively, which are on submount 17. Submount 17 is attached to base 1. Saddle 11 functions as a mechanical bridge between the fiber tube 7 and base 1. The base 1, fiber tube 7, and saddle 11 are desirably made from a low thermal coefficient of expansion material. The fiber tube is in the approximate desired position. An exemplary material is a Fe-Ni-Co alloy commonly referred to as ASTM F15. The coordinate system used to describe the invention is also shown. The laser beams used for welding are directed along the x-axis and strike the interface between the fiber tube and saddle. A dual beam, pulsed Nd:YAG laser is an exemplary choice. The laser is not depicted but is well known to those skilled in the art. A plurality of pin welds is shown; these welds fix the fiber in position with respect to the laser.

Several words describing laser welding of the system depicted will enable the invention to be better understood. The combination of tool elements and pieceparts constitutes a structural system with stiffness requirements. The welding process represents a force input to this system which results in distortion of pieceparts and tooling elements. This distortion can be minimized by tool design that maximizes the stiffness of the system subject to the constraints imposed by process and geometrical considerations. A force transducer measured the forces on the saddle and base during welding and found that the forces in the y and z directions built up rapidly after termination of the weld pulse and saturated after approximately 25 msec.

The forces are generated due to the differential expansion of the fiber tube and saddle. The differences arise because of the different geometries and hence, the different thermoelastic behavior of the two pieces. When the weld pulse is applied, heat propagates through the tube and saddle causing thermoelastic expansions along the y and z directions. The expansion magnitudes of the tube and saddle are expected to differ because of the different geometries. As the weld pool starts to cool and solidify, the tube and saddle try to realize positions that are consistent with their individual temperature distributions. However, the solidifying weld nugget inhibits attainment of these positions thereby causing equal and opposite forces on the tube and saddle. As the weld pool reaches ambient temperature, the internal forces reach a maximum and constant value. From the directions of the forces, we conclude that the saddle expands more than does the tube.

The fiber tube is adjusted in such a manner that coupling losses between the laser and fiber due to distortions produced by the laser welding process are minimized. Although asymmetric distortions are expected along the y and z axes, only the position along the y axis of the fiber, that is, along a direction perpendicular to the longitudinal axis of the fiber, is adjusted. This adjustment is performed during the approximately 25 msec that the weld nugget is compliant and allows itself to be deformed with low levels of residual stresses.

Figure 2:
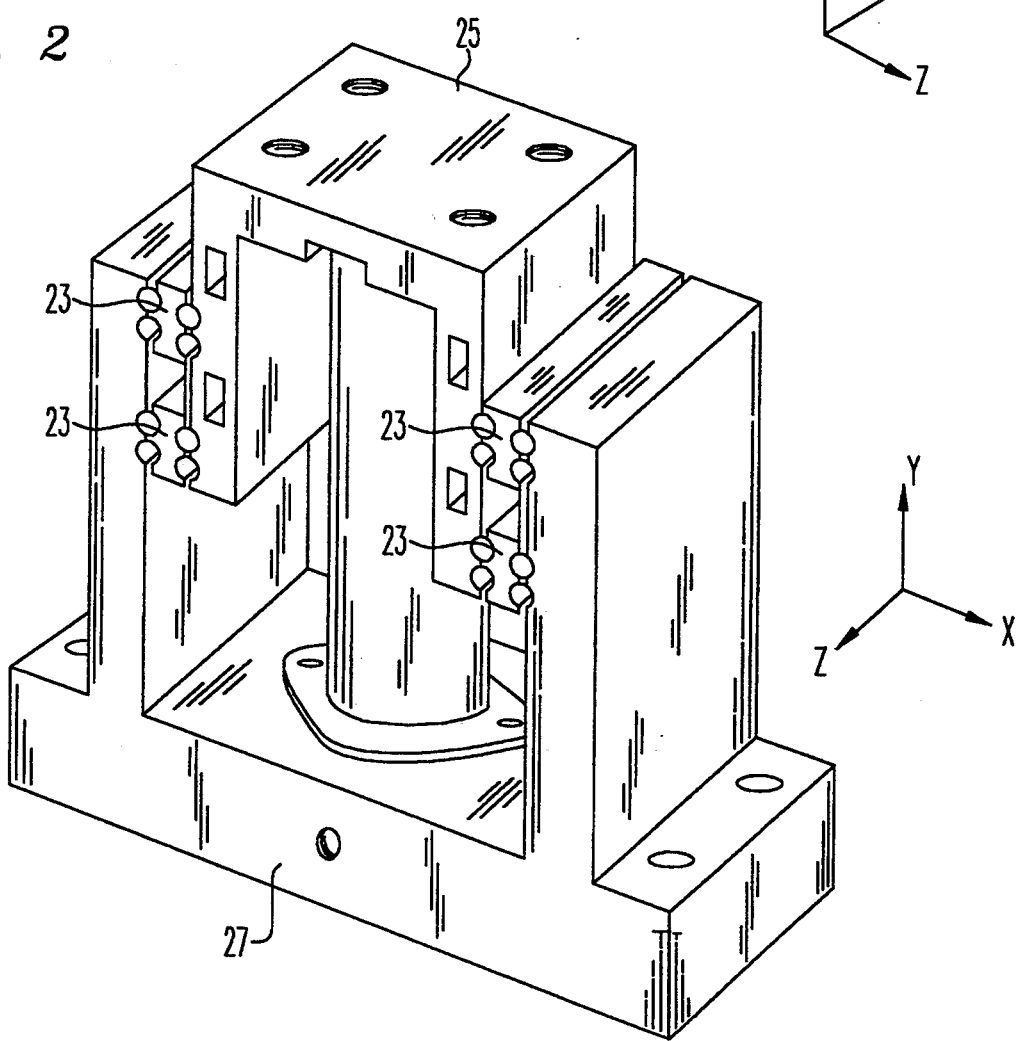
FIG. 2 is a depiction of a piezo-holder useful with this invention.
Figure 3:
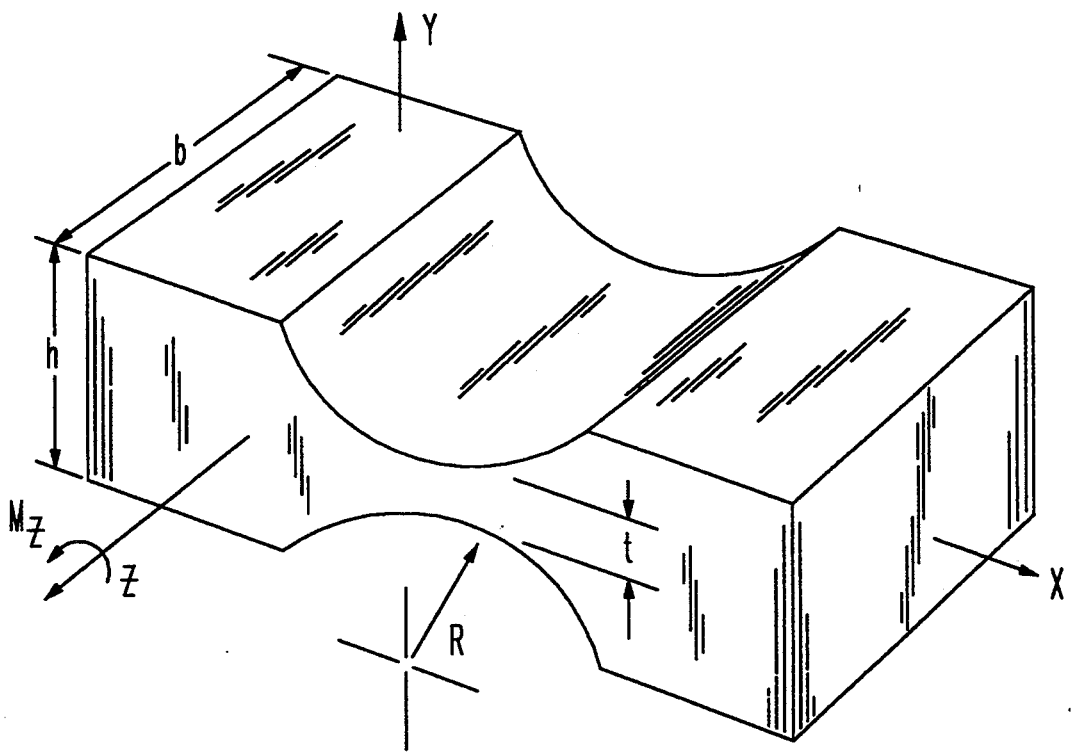
FIG. 3 is a perspective view of a flexure hinge useful with this invention.

Piezoelectric actuators are well known to those skilled in the an and are very stiff along their axial direction,but can not support stresses in the shear direction. A piezo-holder 25 that reduces shear forces and interfaces directly to the tooling is depicted in FIG. 2. The x, y, and z directions are shown. Base 27 is attached to the piezoactuator. The actuator and piezo-holder form a single unit in which expansion and contraction of the actuator is transmitted directly to the holder. Additionally, the holder provides straight line motion and does not restrict the motion range of the actuator. The holder operates as a rectilinear spring along the axial direction of the actuator. In an exemplary embodiment, this structure is constructed using flexure hinge 23. Such hinges are mechanical members which are compliant for bending about one axis but rigid about orthogonal axes and are shown in more detail in FIG. 3. Heights, width, thickness, and radius of curvature are shown. Direction of rotation of the hinge is also indicated. Flexure hinges offer a mechanical drive system with negligible backlash and zero slip stick friction. The holder depicted has two parallel spring mechanisms to provide guidance for straight line motion along the axial direction. Each spring has 4 bars with joints made from flexure hinges. Axial expansion of the actuator causes a torque to be applied to each spring. The flexure hinges rotate and cause the inner member of the spring to be displaced - either up or down.

The control strategy for moving the fiber will be described. The coupled optical power into the fiber was monitored in real time and corrective commands were given to the piezo positioning system that holds the fiber. However, the coupled power signal is noisy (due to optical and electro-magnetic effects) during and immediately after the end of the welding pulse, and it is necessary to delay the control action until noise effects had been suppressed. Approximately 6 msec of delay was found to be sufficient. The control strategy moves the actuator, and thus the fiber, a distance that is proportional to the change in the coupled power. The relationship between displacement and coupled power is determined during the alignment phase. This relationship is then used during the control phase to determine the required fiber displacement from the observed loss in coupled power.

The coupled power signal provides an estimate of the total relative movement between the laser and the fiber. The direction of movement is unobservable and must be deduced. This is accomplished by moving the fiber in a preset direction and observing the effect on the power transmitted through the fiber. If the power increases, the controller concludes that the compensation is in the correct direction. If not, the direction of motion is reversed. To provide a safeguard from noise in the feedback signal and from coupled power changes due to motion in other than the control direction, the control action is terminated if the number of successive reversals exceeds a user set parameter. This number will be readily selected by the user.

Due to the discrete nature of the control scheme, the controller output is updated only at discrete intervals. As previously explained, about 25 msec after an initial 6 msec period, is available for control purposes. If it is assumed that 6 control commands are required, the desired controller output should be updated at 4 msec intervals. To accomplish this, the mechanical system should not exhibit significant oscillations for a 250 Hz square pulse input. The first resonant frequency was found to be 510 Hz and a 250 Hz update rate was used to control the piezo position. Other systems will likely use other values for these parameters; such values will be readily determined by those skilled in the art.

Figure 4:
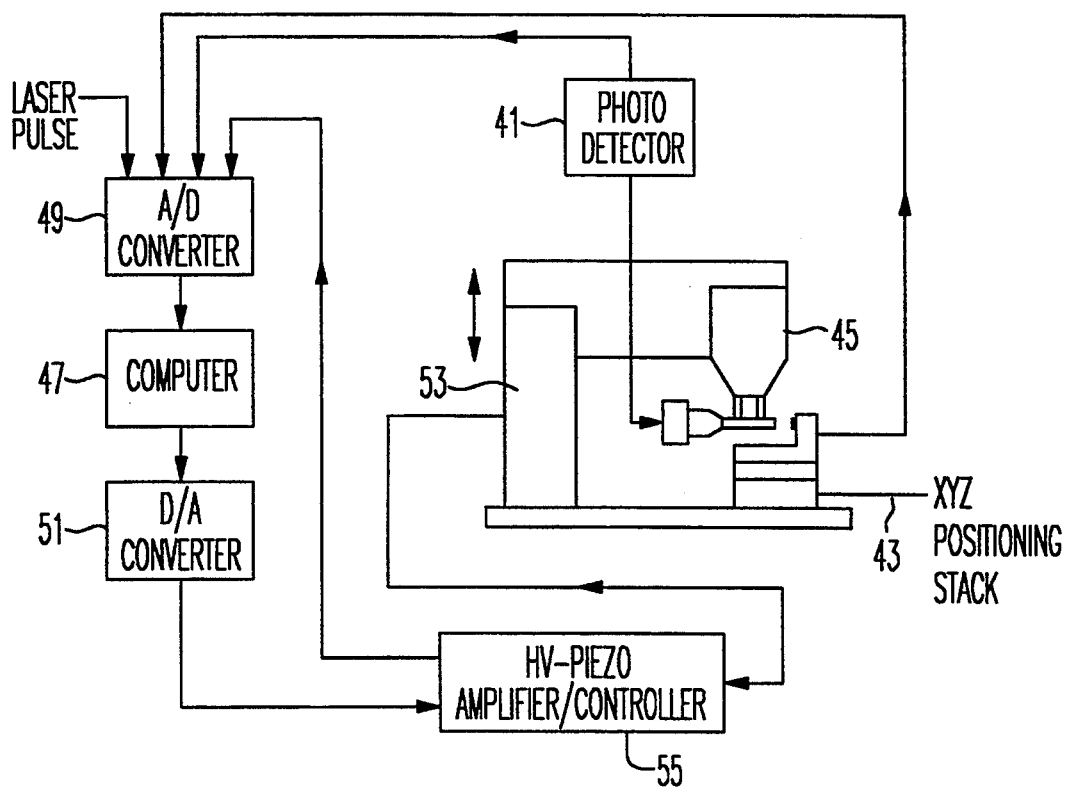
FIG. 4 is a depiction of equipment used to implement the method of this invention.

Equipment useful for the implementation of the method of this invention is schematically depicted in FIG. 4. There is a photodetector 41 for detecting the light output from the back face of the laser. There is an x- y-z positioning stack 43 which holds the base. There is a fiber gripper 45 which is controlled by the piezo actuator 53. Also depicted are a control computer 47 and a an A/D converter 49 used for data I/O. There is also a D/A converter 51 which sends information to the HV-amplifier 55 which is connected to piezo actuator 53. The control program monitors four input signals through the A/D converter port. These signals are: the weld pulse(voltage through the discharging capacitors in the welding unit); the back monitor current(this signal reflects the amount of light incident on the active area of the monitor chip which is proportional to the amount of optical energy emerging from the front of the laser); the piezo position; and the coupled power. One control signal, the absolute position of the piezo positioner, is sent from the computer through the D/A port to the high voltage amplifier/piezo controller 55 that is connected to the actuator. The piezo controller implements a proportional integral control utilizing a feedback position signal from the built-in strain gage displacement sensor on the actuator. The laser pulse is incident on the fiber tube and saddle.

Variations in the embodiment described will be readily apparent to those skilled in the art. For example, the invention has been described with respect to the attachment of a laser to an optical package; other types of devices can be attached to other types of packages using the method of this invention. Additionally, the fiber need not be a single mode fiber.

We claim:

1. A method of manufacturing an optical package comprising the steps of:

attaching a laser to a base;

positioning an optical fiber in a fiber tube in a saddle in an approximate desired position with respect to said laser, laser welding said optical fiber in said position by selectively heating the interface between said fiber tube and said saddle to weld said fiber tube and said saddle;

monitoring the position of said fiber during said welding; and using a piezoelectric actuator to move said fiber to said final desired position during said laser welding.

2. A method as recited in claim 1 in which said actuator moves said fiber in a direction perpendicular to the longitudinal axis of said fiber.

3. A method as recited in claim 2 in which said monitoring measures the optical energy transmitted through said fiber from said laser.

4. A method as recited in claim 1 in which said piezoelectric actuator comprises at least one flexure hinge.

5. A method as recited in claim 3 in which said monitoring is continued after said laser is turned off.

6. A method as recited in claim 5 in which said fiber is not moved until said laser is turned off.

* * * * *